United States Patent
Fontela

(10) Patent No.: US 12,122,126 B2
(45) Date of Patent: Oct. 22, 2024

(54) REINFORCED SAFETY GLASS AND METHOD OF MANUFACTURE

(71) Applicants: XSOLUTIONS S.A., Buenos Aires (AR); Julia Cristina Sboro, Buenos Aires (AR)

(72) Inventor: Alberto Oscar Fontela, Buenos Aires (AR)

(*) Notice: Subject to any disclaimer, the term of this patent is extended or adjusted under 35 U.S.C. 154(b) by 0 days.

(21) Appl. No.: 17/476,084

(22) Filed: Sep. 15, 2021

(65) Prior Publication Data

US 2022/0009206 A1  Jan. 13, 2022

Related U.S. Application Data

(63) Continuation-in-part of application No. 15/758,174, filed as application No. PCT/US2016/051140 on Sep. 9, 2016, now abandoned.

(30) Foreign Application Priority Data

Sep. 10, 2015  (AR) ............................ 20150102890

(51) Int. Cl.
   *B32B 17/10*   (2006.01)
(52) U.S. Cl.
   CPC .. *B32B 17/10779* (2013.01); *B32B 17/10018* (2013.01); *B32B 17/10761* (2013.01);
   (Continued)
(58) Field of Classification Search
   CPC ........ B32B 17/10018; B32B 17/10027; B32B 17/10165; B32B 17/10779; B32B 2250/03; B32B 2307/558; B32B 2367/00; B32B 27/40; B32B 7/12; B32B 17/10761; B32B 27/08; B32B 27/36
   See application file for complete search history.

(56) References Cited

U.S. PATENT DOCUMENTS 5,622,580 A * 4/1997 Mannheim ........ B32B 17/10743
                                                100/295
2012/0076965 A1* 3/2012 Silvers ................. B65D 1/0207
                                                264/521

FOREIGN PATENT DOCUMENTS

EP      0419848 A2 * 4/1991
JP   2000167988 A  * 6/2000
(Continued)

OTHER PUBLICATIONS

Machine translation of KR20090096194A, retrieved Jun. 30, 2023. (Year: 2009).*
(Continued)

*Primary Examiner* — Callie E Shosho
*Assistant Examiner* — Krupa Shukla
(74) *Attorney, Agent, or Firm* — Cotman Ip law group

(57) ABSTRACT

Safety glass and method for its obtainment is presented. The safety glass includes a single glass plate with at least one layer of Polyvinyl butyral ("PVB") film applied without adhesive over the interior face of the glass plate and at least one layer of Crystallizable PolyEthylene Terephthalate ("C-PET") film applied without adhesive over the at least one PVB film layer on the interior face of the glass plate. The safety film optionally includes a safety film layer for shatter-proofing applied over the exterior face of the single glass plate and/or over the at least one C-PET film layer on interior face of the single glass plate.

2 Claims, 2 Drawing Sheets

(52) U.S. Cl.
CPC .. *B32B 17/10853* (2013.01); *B32B 17/10981* (2013.01); *B32B 17/1099* (2013.01); *B32B 2250/03* (2013.01); *B32B 2307/732* (2013.01)

(56) References Cited

FOREIGN PATENT DOCUMENTS

| | | | |
|---|---|---|---|
| JP | 2005207226 A | * | 8/2005 |
| KR | 20090096194 A | * | 9/2009 |
| WO | WO-9324320 A1 | * | 12/1993 ....... B32B 17/10018 |

OTHER PUBLICATIONS

Demïrel et al., Journal of Balikesir University Institute of Science and Technology, 13(1), pp. 26-35, 2011. (Year: 2011).*
Machine translation of JP-2005207226-A, retrieved Jun. 30, 2023. (Year: 2005).*
Machine translation of JP-2000167988-A, retrieved Jul. 26, 2024. (Year: 2000).*

* cited by examiner

REINFORCED SAFETY GLASS AND METHOD OF MANUFACTURE

CROSS-REFERENCE TO RELATED APPLICATIONS

The present application is a continuation-in-part of U.S. patent application Ser. No. 15/758,174, filed on Mar. 7, 2018, now abandoned which is a 371 of international application PCT/US16/51140, filed on Sep. 9, 2016, all of which are herein incorporated by reference for completeness of disclosure.

BACKGROUND OF THE INVENTION

Field of the Invention

This invention refers to a safety glass and its obtainment procedure. Although it may have diverse application fields, its development arises from the need for safety glasses of high resistance in order to increase the safety of vehicles' occupants.

Description of the Related Art

The current status of the technique involves diverse combinations of materials and procedures to obtain armored glasses. Common materials used are:
- a) Polyvinyl butyral films (herein after referred to as "PVB"). Example: PVB films manufactured by Kuraray Arg.
- b) PolyEthylene Terephthalate films (hereinafter referred to as "PET"), generally Crystallizable PolyEthylene Terephthalate because of its high transparency (hereinafter referred to as "C-PET"). Example: PET films manufactured by Kuraray Arg.
- c) PolyUrethane films (hereinafter referred to as "PU"). Example: PU films manufactured by Dayplas S.A.
- d) Safety films with adhesive, such as those manufactured by Llumar, 3M, Madico, Johnson & Johnson, Sunguard, etc.
- e) Safety films without adhesive, such as those also manufactured by Llumar, 3M, Sunguard, etc. or safety films with adhesive from which the adhesive is removed.
- f) Special glasses or original glasses, e.g. tempered glass, are also used.

Each of these materials have diverse densities and one or more layers may be used. The point is that the key to obtain positive and practical results for each need is based on the combination of films and especially on the procedure by which these films are combined with glass. This is where this invention stands out and where one of the pillars which provide the basis for this patent application lies.

Furthermore, there are operating aspects such as a higher efficiency and flexibility of procedures, together with the impact of such procedures on the environment, which could not be solved to date.

In accordance with what has been analyzed above, some antecedents for informational purposes follow:

European Patent No. EP1322467B1 "INTRUSION RESISTANT GLASS LAMINATE" granted on Nov. 28, 2007. It consists of a laminated glass composed of a first PVB film+a first PET film+a second PET film+a second PVB film, all of these inserted between two glasses. These films are placed between two glasses as usual. Aside from the details of the procedure, in this case two PET films are placed between PVB films, all of which is placed between two glasses, that is, two glasses are needed.

U.S. Pat. No. 5,569,537 "Laminated glass with polyurethane resin layer and silane coupling agent layer" granted on Oct. 29, 1996. This patent protects laminated glass with polyurethane films which requires an adhesive agent. It is based on the chemical aspects of the silane agent.

U.S. Pat. No. 5,445,890 "Bullet resistant glass/glass, glass/plastic, and plastic/plastic laminate composites" granted on Aug. 29, 1995. This patent protects a composite of laminated glass which comprises at least 2 glasses bonded by a layer of adhesive polyester. It may or may not include a "plastic" film between the two glasses, bonded by adhesive polyester.

U.S. Pat. No. 4,241,140 "Laminated safety glass with polyurethane film", granted on Dec. 23, 1980. It specifically protects polyurethane film used for safety glasses.

U.S. Pat. No. 4,075,386 "Security film for shatterproofing windows" granted on Feb. 21, 1978. This patent refers to a method of applying films with adhesive and watery detergent. It comprises the basic concept of safety films.

PCT Patent Application WO2003006240 A1 "Compositor interlayer for laminated glass" published on Jan. 23, 2013. This application claims the joint use of PU and PVB without considering a key aspect of the procedure modified by this application.

U.S. Pat. No. 4,594,290 "Impact resistant laminate" granted on Jun. 10, 1986. It refers to a laminate with high ballistic resistance. It uses glass, PU, PMMA and PC.

Although we have seen great progress in safety glasses during the last decades, a correct combination of films without adhesive which only requires a single glass, offering exceptional characteristics regarding resistance to impact, high transparency and low impact on the environment, could not be achieved yet. These are the key aspects of this invention.

SUMMARY OF THE INVENTION

One of the purposes of this invention is to obtain a safety glass which offers high resistance to impacts using a single glass.

Another purpose of this invention is to manufacture a safety glass reinforced on its interior as well as its exterior faces.

Another purpose of this invention is to create an innovative method for the obtainment of a reinforced safety glass which reduces substantially the impact on the environment.

Another purpose of this invention is to obtain a safety glass which, once broken, avoids the risk of cuts, lacerations or injuries of any kind.

Additionally, another purpose of this invention is to obtain a safety glass which offers a higher sound isolation inside vehicles.

Finally, another purpose of this invention is to obtain a safety glass which reduces the passage of UV rays to the inside of vehicles, reducing, as a result, the temperature inside them.

One or more embodiments of the present invention comprises a single glass plate to be reinforced. The single glass plate is usually tempered. The reinforcement is accomplished with at least one layer of PVB film applied over the interior face of the glass plate and at least one layer of Crystallizable PolyEthylene Terephthalate ("C-PET") film applied without adhesive over the at least one PVB film layer on the interior face of the glass plate.

One or more embodiments of the present invention further comprises a safety film layer for shatter-proofing applied over the at least one C-PET film layer on interior face of the single glass plate over the exterior face of the single glass plate.

One or more embodiments of the safety glass apparatus comprises a single glass plate with a first layer of at least one PVB film applied without adhesive over the interior face of the single glass plate, a first layer of at least one C-PET film applied without adhesive over the first layer of at least one PVB film on the interior face of the single glass plate.

One or more embodiments of the safety glass apparatus comprises a second layer of at least one PVB film applied without adhesive over the exterior face of the single glass plate and a second layer of at least one C-PET film applied without adhesive over the second layer of at least one PVB film on the exterior face of the single glass plate.

One or more embodiments of the safety glass apparatus comprises a first safety film sheet layer for shatter-proofing applied over the first layer of the at least one C-PET film on the interior face of the single glass plate and a second safety film sheet layer for shatter-proofing applied over the second layer of the at least one C-PET film on the exterior face of the single glass plate.

DETAILED DESCRIPTION

Figure 1:
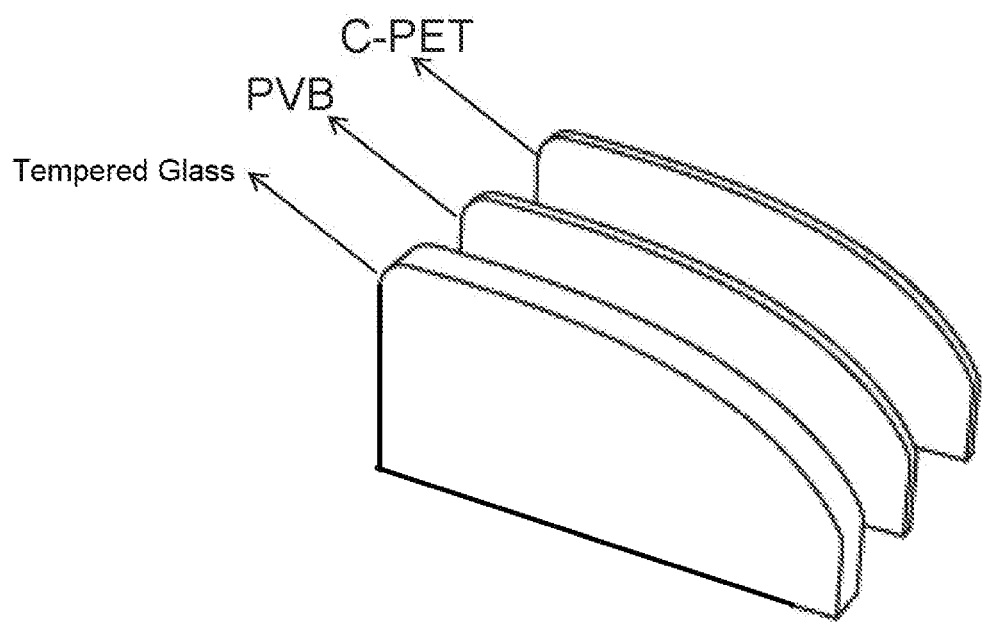
FIG. 1 schematically shows the components of a first exemplary embodiment of the safety glass.

The present invention comprising reinforced safety glass and method of manufacture will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced items.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to", "at least", "greater than", "less than", and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth. The phrases "and ranges in between" can include ranges that fall in between the numerical value listed. For example, "1, 2, 3, 10, and ranges in between" can include 1-1, 1-3, 2-10, etc. Similarly, "1, 5, 10, 25, 50, 70, 95, or ranges including and or spanning the aforementioned values" can include 1, 5, 10, 1-5, 1-10, 10-25, 10-95, 1-70, etc.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
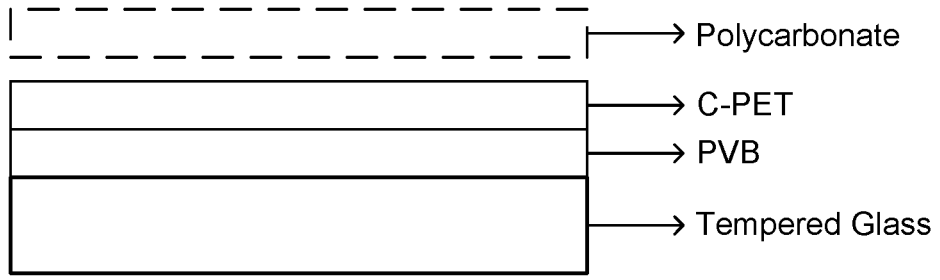
FIG. 2 shows a cut outline of the components of the first exemplary embodiment of the safety glass of this invention, including a polycarbonate film used as a bonding agent during the manufacturing process. Specifically, during the pre-laminating process.
Figure 3:
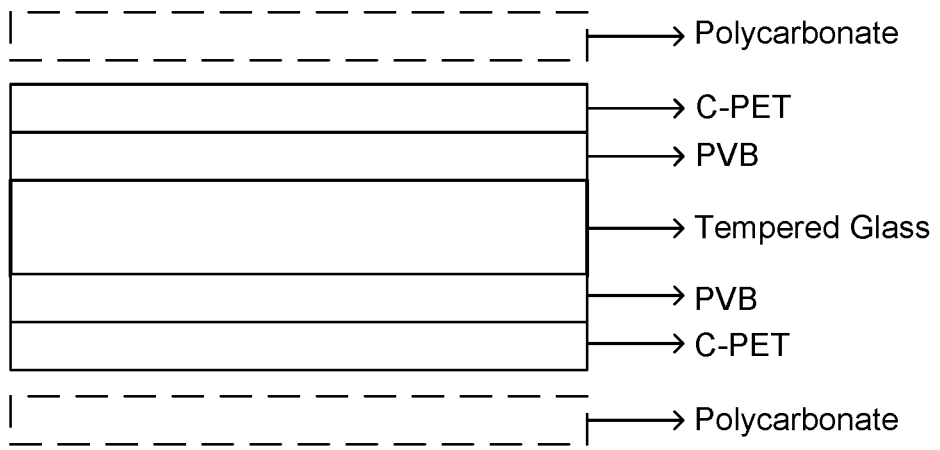
FIG. 3 shows a cut outline of the components of a second exemplary embodiment of the reinforced safety glass of this present invention, including both polycarbonate films used during the assembling process. Specifically, during the pre-laminating process.

The present invention comprising safety glass 1 and the procedure for its obtainment will now be described using FIGS. 1 through 3.

High resistance safety glasses are used to provide higher safety inside the room surrounded at least partially by said glass. This invention has diverse application fields such as apertures for homes, surveillance booths and banks. However, its main application are vehicles of all kinds because it uses their original glass, therefore eliminating the need for specific glasses. This application stands out from others which require the manufacturing of a new tempered glass during the manufacturing of the safety glass.

In order to obtain the safety glass of this present invention, films of diverse reinforcing materials are used. Their special features offer higher resistance to the glass. During the manufacturing process, pressure and temperature are applied using autoclave in order to bond the reinforcing films to the original glass and between each other.

In addition to the tempered glass, one or more embodiments of the present invention comprises Polyvinyl Butyral films (herein after referred to as "PVB").

One or more embodiments of the present invention comprises PolyEthylene Terephthalate films (hereinafter referred to as "PET"), generally Crystallizable PolyEthylene Terephthalate because of its high transparency (hereinafter referred to as "C-PET").

One or more embodiments of the present invention comprises safety films. The safety film is applied to the safety glass for shatter-proofing. The safety film generally comprises a polyester film or sheet (or plastic film or sheet), i.e. thin continuous polymeric material, used to secure glass in the event of breakage. Specific embodiments of the safety film comprise a polyurethane stratum interposed between a pair of polyester strata, each of which is self-supporting. The safety film may be bonded to the glass by a pressure sensitive adhesive, for example. The safety film is added to provide shatter-proofing of the glass against impact or explosion, and, more particularly, to shield and prevent fragmentation of glass notwithstanding its splintering or cracking when damaged.

Each of the film materials used herein have diverse densities and one or more layers may be used. The point is that the key to obtain positive and practical results for each need is based on the combination of films and especially on the procedure by which these films are combined with glasses. This is where this invention stands out and where one of the pillars which provide the basis for this patent application lies.

From the point of view of its construction, the safety glass is basically composed of the original glass (tempered glass), i.e. single glass plate, to be reinforced (with or without adhesive in its inner face), at least one PVB film layer and at least one C-PET film layer, in this same order.

An exemplary embodiment of the present invention, comprises at least one PVB film with a thickness of between 0.18 mm and 2 mm and a C-PET film with a thickness of between 0.18 mm and 2 mm.

In addition to the PVB and C-PET film layers, one or more embodiments of the present invention comprises a safety film applied over the exterior face of the single glass plate to be reinforced. In one or more embodiments, the safety film layer is applied over the C-PET film layer on the interior face and/or the exterior face of the single glass plate. The safety film layer may be applied with or without adhesive.

The thickness of the safety film (either with or without adhesive) is preferably approximately between 40 μm and 400 μm.

In another exemplary embodiment of the safety glass, the exterior face of the single glass plate is reinforced once the interior face is reinforced. In other words, at least one PVB film layer and one C-PET film layer are applied, in this same order, to the exterior face of the glass, without adhesives.

In addition to the PVB and C-PET film layers, one or more embodiments of the present invention comprises a safety film applied over the C-PET film layers on the interior face and on the exterior face of the single glass plate. The safety film may be applied with or without adhesive.

Having described the exemplary embodiments of this invention, the steps for the obtainment of the safety glass are as follows.

For the first exemplary embodiment:
a) thorough cleaning of the original glass;
b) ionize with ionizing gun at least one PVB film;
c) insert at least one PVB film on the interior face of the original glass;
d) ionize with ionizing gun at least one C-PET film;
e) place at least one C-PET film over at least one PVB film;
f) cut the excess of PVB and C-PET films by the edges;
g) place a cover of polycarbonate, generally with a thickness between 1.5 and 4 mm, over the last C-PET film;
h) place the product obtained from steps a) to g) inside a vacuum bag;
i) vacuum the obtained product;
j) put the vacuum bag inside an autoclave until it reaches a pressure of between 2 and 4 bar and a temperature of between 75° C. and 90° C.;
k) once it reaches the temperature and pressure values indicated in step j) keep them constant for 40 minutes to 60 minutes;
l) activate the cooling system of the autoclave until it reaches 70° C.;
m) eliminate the air from the autoclave and open it;
n) take the obtained product inside the vacuum bag out of the autoclave;
o) remove the polycarbonate cover;
p) make sure there are no air bubbles between the films;
q) put the obtained product (without the polycarbonate cover and the vacuum bag) inside the autoclave again;

r) activate the compressor until it reaches a pressure of between 1.5 and 3 bar;
s) activate the autoclave until it reaches a temperature of between 120° C. and 135° C. and a pressure of between 5 bar and 12 bar;
t) once it reaches the values indicated in step s) deactivate the compressor and the autoclave until the temperature lowers below 120° C.;
u) activate the cooling system of the autoclave until it reaches 70° C.;
v) eliminate the air from the autoclave and open it;
w) take the obtained product (the safety glass) out of the autoclave;
x) let it reach room temperature;
y) polish the excess of films.

A second exemplary realization, comprises the same steps as the example above, with the addition of step z). That is to say, the complete procedure comprises the following steps:
a) thorough cleaning of the original glass;
b) ionize with ionizing gun at least one PVB film;
c) insert at least one PVB film on the interior face of the original glass;
d) ionize with ionizing gun at least one C-PET film;
e) place at least one C-PET film over at least one PVB film;
f) cut the excess of PVB and C-PET films by the edges;
g) place a cover of polycarbonate, generally with a thickness of between 1.5 and 4 mm, over the last C-PET film;
h) place the product obtained from steps a) to g) inside a vacuum bag;
i) vacuum the obtained product;
j) put the vacuum bag inside an autoclave until it reaches a pressure of between 2 and 4 bar and a temperature of between 75° C. and 90° C.;
k) once it reaches the temperature and pressure values indicated in step j) keep them constant for 40 minutes to 60 minutes;
l) activate the cooling system of the autoclave until it reaches 70° C.;
m) eliminate the air from the autoclave and open it;
n) take the obtained product inside the vacuum bag out of the autoclave;
o) remove the polycarbonate cover;
p) make sure there are no air bubbles between the films;
q) put the obtained product (without the polycarbonate cover and the vacuum bag) inside the autoclave again;
r) activate the compressor until it reaches a pressure of between 1.5 and 3 bar;
s) activate the autoclave until it reaches a temperature of between 120° C. and 135° C. and a pressure of between 5 bar and 12 bar;
t) once it reaches the values indicated in step s) deactivate the compressor and the autoclave until the temperature lowers below 120° C.;
u) activate the cooling system of the autoclave until it reaches 70° C.;
v) eliminate the air from the autoclave and open it;
w) take the obtained product (the safety glass) out of the autoclave;
x) let it reach room temperature;
y) polish the excess of films.
z) place a safety film over the exterior face of the original glass to be reinforced.

Finally, a third procedure, which is used for an exemplary realization which comprises the use of PVB and C-PET films in both the interior and exterior faces of the tempered glass, is as follows:
a) thorough cleaning of the original glass;
b) ionize with ionizing gun at least one PVB film;
c) insert at least one PVB film on the interior face of the original glass;
d) ionize with ionizing gun at least one C-PET film;
e) place at least one C-PET film over at least one PVB film;
f) repeat steps b) to e) applying these to PVB and C-PET films on the exterior face of the glass to be reinforced;
g) cut the excess of PVB and C-PET films from the interior and exterior faces of the original glass;
h) place a polycarbonate cover (generally with a thickness of 1.5 to 4 mm) over the last C-PET films (both in the exterior and the interior faces of the original glass);
i) place the obtained product formed in steps a) to h) inside a vacuum bag;
j) vacuum the obtained product;
k) put the vacuum bag inside an autoclave until it reaches a pressure of between 2 bar and 4 bar and a temperature of between 75° C. and 90° C.;
l) once it has reached the temperature and pressure values indicated in step k) keep them constant for 40 minutes to 60 minutes;
m) activate the cooling system of the autoclave until it reaches 70° C.;
n) eliminate the air from the autoclave and open it;
o) take the obtained product inside the vacuum bag out of the autoclave;
p) remove the polycarbonate cover;
q) make sure there are no air bubbles between the films;
r) put the obtained product (without the polycarbonate cover and the vacuum bag) inside the autoclave again;
s) activate the compressor until it reaches a pressure of between 1.5 and 3 bar;
t) activate the autoclave until it reaches a temperature of between 120 and 135° C. and a pressure of between 5 bar and 12 bar;
u) once it reaches the pressure and temperature values indicated in steps s) and t), deactivate the compressor and the autoclave until the temperature lowers below 120° C.;
v) activate the cooling system of the autoclave until it reaches 70° C.;
w) eliminate the air from the autoclave and open it;
x) take the obtained product (the safety glass) out of the autoclave;
y) let it reach room temperature;
z) polish the excess of the films.

The revolutionary aspect of this last "sandwich-type" procedure, where the laminated glass is bonded to both polymer films, is that it eliminates the risk of cuts, lacerations, or injuries of any kind in the event that the tempered glass is damaged or broken. This is because all fragments of the laminated glass would stay adhered to either the internal or external polymer layers, or both.

As those of skill in this field would understand, this aspect arises from the procedure itself. The fact that the purpose of this description is to enable an ordinary person to put the invention into practice, should not leave aside the broadness of this application. That is to say, minor modifications, for instance in the number of films used (materials), their thickness, the temperatures and/or pressures of the autoclave during the diverse stages of the procedure to obtain the safety glass, etc., are taken into consideration in the present invention.

What is claimed is:

1. A safety glass apparatus consisting of:
   a single glass plate with an interior face and an exterior face;
   a first layer of an at least one Polyvinyl butyral ("PVB") film applied without adhesive over the interior face of the single glass plate;
   a first layer of an at least one Crystallizable Polyethylene Terephthalate ("C-PET") film applied without adhesive over the first layer of the at least one Polyvinyl butyral (PVB) film on the interior face of the single glass plate;
   a second layer of an at least one Polyvinyl butyral (PVB) film applied without adhesive over the exterior face of the single glass plate; and
   a second layer of an at least one Crystallizable Polyethylene Terephthalate (C-PET) film applied without adhesive over the second layer of the at least one Polyvinyl butyral (PVB) film on the exterior face of the single glass plate wherein the at least one layer of PVB film has a thickness between 0.25 mm and 2 mm and wherein the at least one layer of C-PET film has a thickness between 0.25 mm and 2 mm.

2. The safety glass apparatus of claim 1, which is prepared by a method comprising the following steps:
   a) cleaning of the single glass plate;
   b) ionizing the first layer of the at least one Polyvinyl butyral (PVB) film with ionizing gun;
   c) placing the ionized first layer of the at least one Polyvinyl butyral (PVB) film on the interior face of the single glass plate;
   d) ionizing the first layer of the at least one Crystallizable Polyethylene Terephthalate (C-PET) film with ionizing gun;
   e) placing the ionized first layer of the at least one Crystallizable Polyethylene Terephthalate (C-PET) film over the ionized first layer of the at least one Polyvinyl butyral (PVB) film;
   f) ionizing the second layer of the at least one Polyvinyl butyral (PVB) film with ionizing gun;
   g) placing the ionized second layer of the at least one Polyvinyl butyral (PVB) film on the exterior face of the single glass plate;
   h) ionizing the second layer of the at least one Crystallizable Polyethylene Terephthalate (C-PET) film with ionizing gun;
   i) placing the ionized second layer of the at least one Crystallizable Polyethylene Terephthalate (C-PET) film over the ionized second layer of the at least one Polyvinyl butyral (PVB) film;
   j) placing a polycarbonate cover with a thickness of between 1.5 to 4 mm over the outermost Crystallizable Polyethylene Terephthalate (C-PET) film on both the exterior face and the interior face of the single glass plate to form an intermediate product;
   k) placing the intermediate product inside a vacuum bag;
   l) vacuuming the intermediate product;
   m) placing the vacuum bag inside an autoclave until it reaches a pressure of between 2 and 4 bar and a temperature of between 75° C. and 90° C.;
   n) once the autoclave reaches the temperature and pressure values indicated in step m), keeping them constant for 40 minutes to 60 minutes;
   o) activating a cooling system of the autoclave until the temperature reaches 70° C.;
   p) eliminating air from the autoclave and open the autoclave;
   q) removing the intermediate product from the autoclave and the vacuum bag;
   r) removing the polycarbonate cover from the intermediate product resulting in a safety glass;
   s) checking to make sure there are no air bubbles between the Polyethylene Terephthalate (C-PET) film layers first layer of the at least one PVB film and the first layer of the at least one C-PET film and between the second layer of the at least one PVB film and the second layer of the at least one C-PET film of the safety glass;
   t) placing the safety glass inside the autoclave;
   u) activating the autoclave's compressor until it reaches a pressure of between 1.5 and 3 bar;
   v) activating the autoclave until it reaches a temperature value of between 120° C. and 135° C. and a pressure value of between 5 bar and 12 bar;
   w) once the autoclave reaches the values indicated in step v), deactivating the compressor and the autoclave until the temperature lowers below 120° C.;
   x) activating the cooling system of the autoclave until it reaches 70° C.;
   y) eliminating air from the autoclave and open the autoclave;
   z) removing the safety glass out of the autoclave;
   aa) allowing the safety glass cool to room temperature; and
   bb) polishing excess films from the safety glass.

* * * * *